(12) United States Patent
Tokoro et al.

(10) Patent No.: US 10,473,949 B2
(45) Date of Patent: Nov. 12, 2019

(54) SYSTEMS AND METHODS FOR AN OPTICAL IMAGE STABILIZER SYSTEM

(71) Applicant: SEMICONDUCTOR COMPONENTS INDUSTRIES, LLC, Phoenix, AZ (US)

(72) Inventors: Tetsuya Tokoro, Ichinomiya (JP); Yukihiko Shigeoka, Godo-cho (JP); Yasuo Hayashi, Nannou-cho (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 159 days.

(21) Appl. No.: 15/419,286

(22) Filed: Jan. 30, 2017

(65) Prior Publication Data

US 2018/0217396 A1 Aug. 2, 2018

(51) Int. Cl.
*G02B 27/64* (2006.01)
*H02K 41/035* (2006.01)
*H02K 11/215* (2016.01)

(52) U.S. Cl.
CPC ......... *G02B 27/646* (2013.01); *H02K 11/215* (2016.01); *H02K 41/0354* (2013.01)

(58) Field of Classification Search
USPC .................................. 396/52–55; 348/208.99
See application file for complete search history.

(56) References Cited

U.S. PATENT DOCUMENTS

| | | | | |
|---|---|---|---|---|
| 5,398,132 A | * | 3/1995 | Otani | G02B 27/646 348/E5.046 |
| 5,748,993 A | * | 5/1998 | Shiomi | G03B 5/00 396/52 |
| 5,873,004 A | * | 2/1999 | Shiomi | G03B 5/00 348/208.2 |
| 6,047,133 A | * | 4/2000 | Washisu | G02B 27/646 348/E5.046 |
| 6,091,448 A | * | 7/2000 | Washisu | H04N 5/23248 348/208.16 |
| 6,307,678 B2 | * | 10/2001 | Kosaka | G02B 27/646 359/554 |

(Continued)

FOREIGN PATENT DOCUMENTS

| | | |
|---|---|---|
| JP | 200010141 A | 1/2000 |
| JP | 2015075617 A | 4/2015 |
| WO | 2015087533 A1 | 6/2015 |

*Primary Examiner* — Clayton E. LaBalle
*Assistant Examiner* — Warren K Fenwick
(74) *Attorney, Agent, or Firm* — The Noblitt Group, PLLC; Hettie L. Haines

(57) ABSTRACT

The optical image stabilizer system according to various aspects of the present technology may comprise a set of springs connected to a lens such that the force exerted by the set of springs and the force exerted by gravity are in equilibrium. A position detection sensor may be linked to the lens and detect a current position of the lens. An accelerometer may be communicatively linked to the lens and generate a set of acceleration data corresponding to the acceleration of the lens. A control unit may be coupled to at least one of the lens, position detector sensor, and the accelerometer, and calculate a new target position for the lens. A motor may be coupled to the lens and respond to the target position received from the control unit.

17 Claims, 6 Drawing Sheets

(56) References Cited

U.S. PATENT DOCUMENTS

Figure 1A:
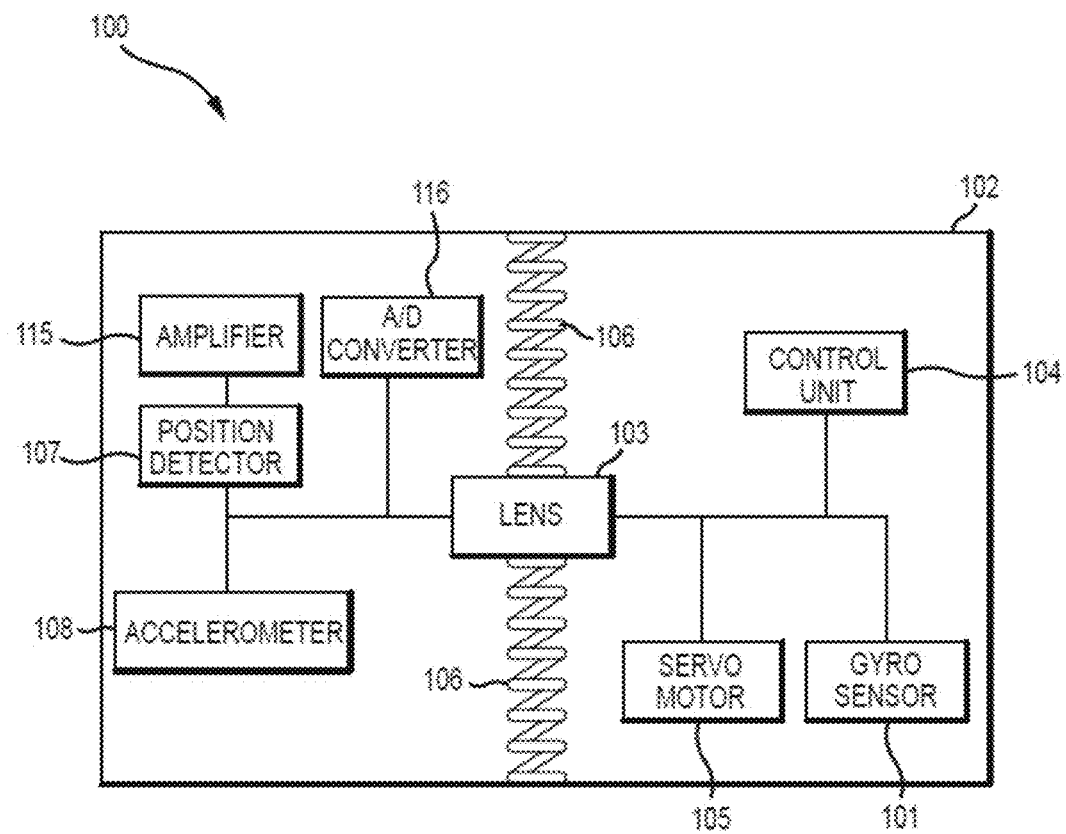

| | | | |
|---|---|---|---|
| 7,580,621 B2* | 8/2009 | Nomura | G02B 27/646 |
| | | | 348/208.4 |
| 7,856,177 B2* | 12/2010 | Ishikawa | G02B 27/646 |
| | | | 396/55 |
| 8,792,011 B2* | 7/2014 | Washisu | G03B 5/00 |
| | | | 348/208.2 |
| 8,964,102 B2* | 2/2015 | Christo | H04N 5/23212 |
| | | | 348/345 |
| 2001/0033454 A1 | 10/2001 | Cvancara | |
| 2005/0129392 A1* | 6/2005 | Shinohara | G03B 5/00 |
| | | | 396/50 |
| 2005/0212753 A1* | 9/2005 | Marvit | G06F 3/017 |
| | | | 345/156 |
| 2006/0056831 A1* | 3/2006 | Horio | H04N 5/23209 |
| | | | 396/55 |
| 2006/0285838 A1* | 12/2006 | Mashima | H04N 5/2259 |
| | | | 396/55 |
| 2011/0176015 A1* | 7/2011 | Yun | H04N 5/23212 |
| | | | 348/208.11 |
| 2013/0025368 A1* | 1/2013 | Donadel | G01C 19/5726 |
| | | | 73/504.12 |
| 2013/0034345 A1* | 2/2013 | Miyahara | H04N 5/23258 |
| | | | 396/55 |
| 2013/0258056 A1* | 10/2013 | Jang | G03B 11/00 |
| | | | 348/46 |
| 2016/0112618 A1* | 4/2016 | Sugaya | H04N 5/2327 |
| | | | 348/208.5 |

\* cited by examiner

SYSTEMS AND METHODS FOR AN OPTICAL IMAGE STABILIZER SYSTEM

BACKGROUND OF THE TECHNOLOGY

Optical image stabilization works by actuating the lens to counteract user-induced shaking to reduce image blurring. Optical image stabilization operates by controlling the path of the image through the lens and onto the image sensor. This may be performed by actuating the lens according to received data corresponding to the movement of the lens from various components such as gyro sensors, servo motors, and/or hall sensors.

SUMMARY OF THE INVENTION

Methods and apparatus for an optical image stabilizer system according to various aspects of the present technology may comprise a set of springs connected to a lens such that the force exerted by the set of springs and the force exerted by gravity are in equilibrium. A position detection sensor may be linked to the lens and detect a current position of the lens. An accelerometer may be communicatively linked to the lens and generate a set of acceleration data corresponding to the acceleration of the lens. A control unit may be coupled to at least one of the lens, position detector sensor, and the accelerometer, and calculate a new target position for the lens. A motor may be coupled to the lens and respond to the target position received from the control unit.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

Figure 1B:
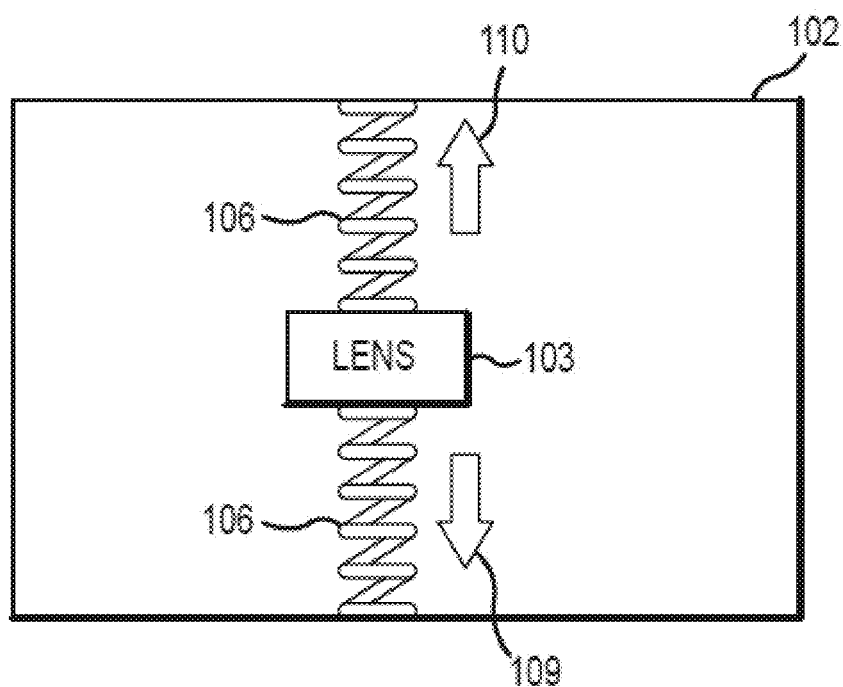
Figure 1C:
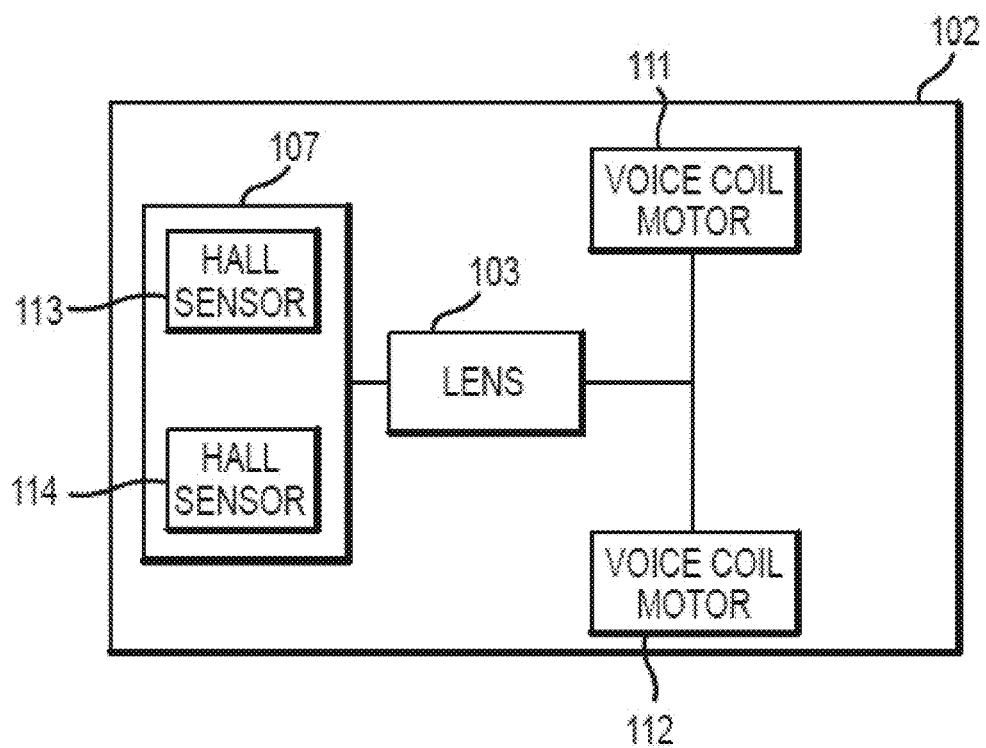
Figure 2A:
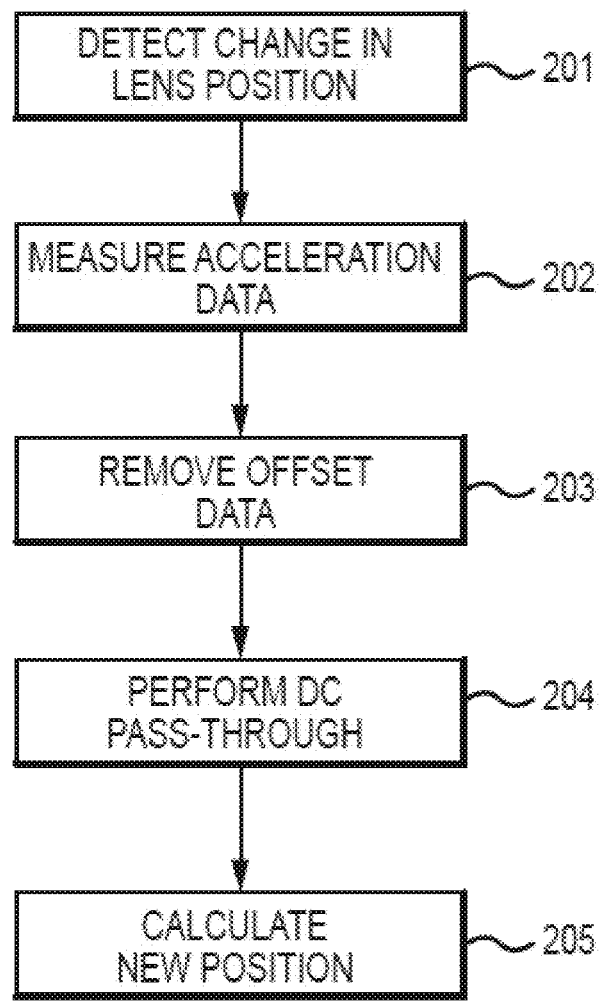
Figure 2B:
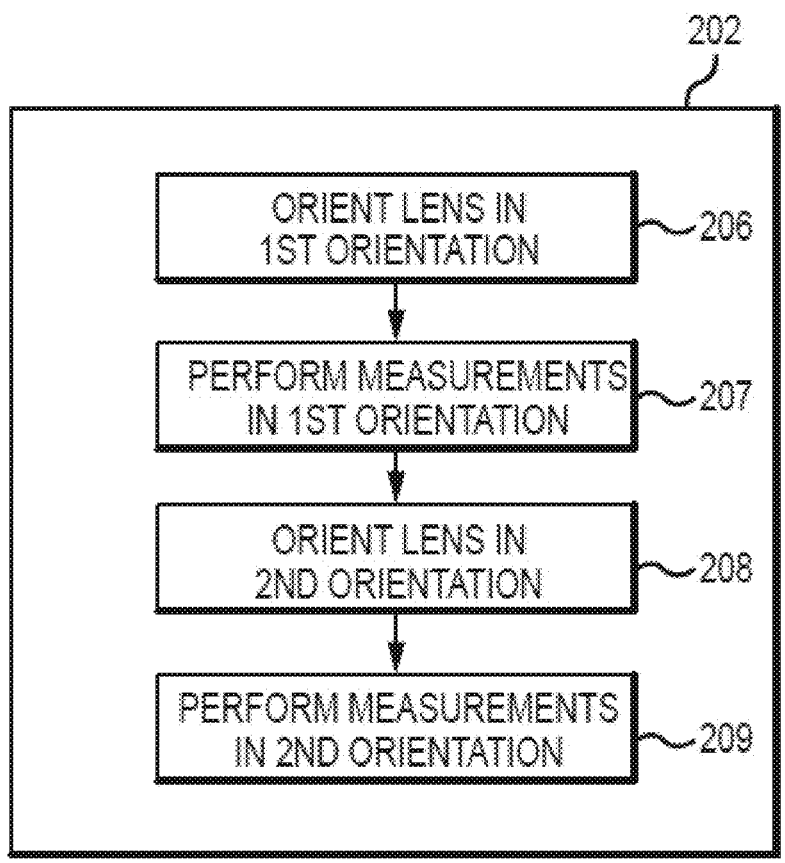
Figure 3:
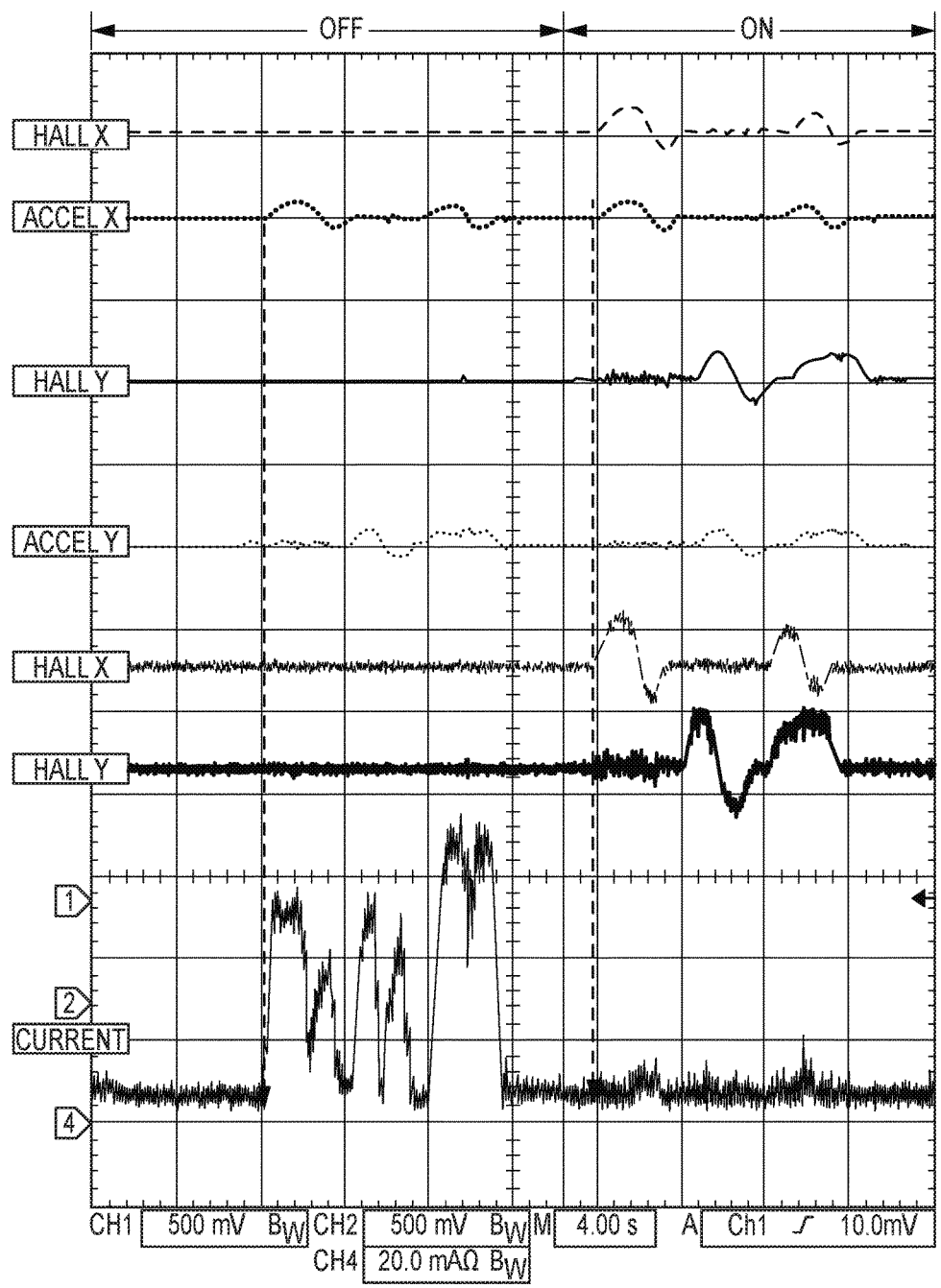

FIG. 1A representatively illustrates a block diagram of the image stabilizer system and its various components;

FIG. 1B representatively illustrates an initial position of the lens where the force exerted by the springs and the force of gravity are in equilibrium;

FIG. 1C representatively illustrates a block diagram of the position detection sensor and various components;

FIG. 2A representatively illustrates a flowchart utilized by the optical image stabilizer system in determining a new target position of the lens;

FIG. 2B representatively illustrates a flowchart of the process utilized by the image stabilizer system in performing the necessary measurements and/or calculations to determine a new target position; and FIG. 3 representatively illustrates the amount of electrical current used by the optical image stabilizer system.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various sensor components, such as hall sensors and accelerometers. In addition, the present technology may be practiced in conjunction with any number of systems, such as portable devices, and the systems described are merely exemplary applications for the technology. Further, the present technology may employ any number of conventional techniques for capturing data, processing data, and the like.

Systems and methods for an optical image stabilizer system according to various aspects of the present technology may operate in conjunction with any suitable electronic system or device, for example a portable electronic device such as a smartphone and the like. Further, systems and methods for an optical image stabilizer system may be utilized with any suitable imaging system.

Referring to FIGS. 1A-C, in one embodiment, the optical image stabilizer (OIS) system 100 may be configured to operate in conjunction with a portable device (e.g., a smartphone device) having a gyro sensor 101 communicatively coupled to a camera module 102. A lens 103 may be disposed within the camera module 102. The gyro sensor 101 may be configured to detect and/or otherwise determine a angular movement of the camera module 102 and/or lens 103 from an initial position to a new position. For example, when a user is operating the portable device as a camera, the user's unsteady hands may cause the lens 103 to move from an initial position to a new position.

The OIS system 100 may be configured with a control unit 104 configured to determine an amount the lens 103 needs to be adjusted using information received from at least one of the gyro sensor 101, a position detection sensor 107, and/or an accelerometer 108. One or more motors, such as a servo motor 105, may be configured to actuate and/or move the lens 103 into the newly determined position. For example, upon the detection of a change in position of the lens 103, a plurality of voice coil motors 111, 112 in the servo motor 105 may move the lens 103 into a new target position such that minimal electrical power is consumed in the process.

In one embodiment, the initial position of the lens 103 may comprise a position where the force of gravity 109 and the force produced by the plurality of springs 106 are in equilibrium. For example, when the camera module 102 and/or the lens 103 are at rest, the force of gravity 109 may exert a downward force on the lens 103 which may drive the lens 103 downward. In contrast to the downward force produced by the force of gravity 109, the plurality of springs 106 may exert an opposite upward force 110. For example, the plurality of springs 106 may exert an upward (i.e., pulling) force 110 to counteract the downward force of gravity 109. The downward force of gravity 109 and the upward force 110 of the plurality of springs 106 may be equivalent such that the lens 103 remains at a constant position without the assistance of any additional components. For example, when the force of gravity 109 and the force of the plurality of springs 106 are in equilibrium, minimal electrical power is required to power the voice coil motors 111, 112 to position the lens 103 into a new position. Thus, when the lens 103 is in such an equilibrium position, the electrical power consumption of the optical image sensor system 100 is at a minimum.

In one embodiment, the plurality of springs 106 may comprise any system of springs configured to hold the lens 103 in a constant position. For example, the plurality of springs 106 may comprise leaf springs. The plurality of springs 106 may be configured with a predetermined amount of spring force such that the spring force 110 of the plurality of springs 106 is equivalent to the downward force of gravity 109.

Now referring to FIGS. 1A-C, in one embodiment, the optical image stabilizer (OIS) system 100 may comprise a position detection sensor 107 communicatively linked to the lens 103 and configured to detect a current position of the lens 103. For example, the position detection sensor 107 may be utilized to detect an initial position of the lens 103 under the influence of gravity 109 and the force 110 applied by the set of springs 106. The position detection sensor 107 may also detect a new position of the lens 103 resulting from a movement of the lens 103.

In one embodiment, the position detection sensor 107 may comprise any suitable system or device configured to determine the position of the lens 103 within the camera module 102, for example along a first axis (e.g., X-axis) and a second axis (e.g., Y-axis). The position of the lens 103 may be represented according to a coordinate system along the first/vertical axis (e.g., Y-axis) and the second/horizontal axis (e.g., X-axis).

In one embodiment, the position detection sensor 107 may comprise a plurality of Hall Effect sensors ("hall sensors") 113, 114 communicatively linked to the lens 103 and/or camera module 102. A first hall sensor 113 may be configured to determine the position of the lens 103 along the horizontal/X-axis and a second hall sensor 114 may be configured to determine the position of the lens 103 along the vertical/Y-axis. The first and second hall sensors 113, 114 may provide position data of the lens 103 to the control unit 104. The detected position of the lens 103 may be represented using a coordinate system along the horizontal and/or vertical axis.

In one embodiment, the hall sensors 113, 114 may be communicatively coupled to an amplifier 115. The amplifier 115 may comprise any suitable system or device configured to amplify the output signal of the hall sensors 113, 114. For example, a typical hall sensor may produce low voltage output signals that are too weak to be utilized by the OIS system 100 and/or its components, such as the control unit 104. Thus, the hall sensor amplifier 115 may amplify the output voltages of the hall sensors 113, 114 such that the information/data may be better utilized by the OIS system 100 and its various components.

In one embodiment, the hall sensors 113, 114 may also be communicatively coupled to an analog-to-digital converter 116. The analog-to-digital converter 116 may convert the analog output of the hall sensors 113, 114 into a digital format. In other embodiments, the hall sensors 113, 114 may produce digital (i.e., non-analog) output signals.

Referring again to FIG. 1A, in one embodiment, the OIS system 100 may comprise an accelerometer 108 communicatively coupled to the lens 103 and configured to detect and/or measure an acceleration of the lens 103 and generate acceleration data corresponding to the detected and/or measured acceleration from the accelerometer 108. The accelerometer 108 may comprise any suitable system or device configured to determine the rate of acceleration in one, two, or more dimensions (e.g., along the X-axis and the Y-axis). The accelerometer 108 may be further configured to determine the rate of acceleration in a third dimension, such as along a Z-axis.

The accelerometer 108 may produce an analog output and/or a digital output. In an analog configuration, the accelerometer 108 output may comprise a continuous voltage that is proportional to the rate of acceleration. For example, 2.5V for 0 g, 2.6V for 0.5 g, and 2.7V for 1 g. In a digital configuration, the accelerometer 108 may utilize other representations, such as pulse width modulation, for the output. For example, the output may comprise a square wave of a certain frequency and the duty cycle, such as the amount of time the voltage is high per cycle, may be proportional the rate of acceleration.

The data produced by the accelerometer 108 may be utilized by the control unit 104 in determining a new position for the lens. The acceleration data may be captured in a variety of ways. For example, the acceleration data may comprise continuous acceleration data, snapshots during predetermined time intervals, and/or the like. The acceleration data may be provided automatically and/or upon request by the OIS system 100 and/or its various components. For example, when the control unit 104 is utilized to determine a new position of the lens 103, the control unit 104 may request current acceleration data from the accelerometer 108.

In one embodiment, the gyro sensor 101 may be configured to detect angular movement in the camera module 102 and/or lens 103. The gyro sensor 101 may comprise any suitable system or device configured to sense movement of the camera module 102 and/or lens 103 in two or three dimensional space. The gyro sensor 101 may further be configured to detect and/or sense changes in the orientation of the camera module 102 and/or lens 103. For example, as described below, the OIS system 100 may be configured to gather measurements in a first orientation, change to a second orientation, and gather additional measurements in the second orientation. The gyro sensor 101 may be configured to provide the detected/sensed information to a control unit 104 such that the OIS system 100 may utilize the gyro sensor 101 information to determine a new target position to move the lens 103. The gyro sensor 101 information may comprise any suitable information, such as displacement, velocity, and/or acceleration data.

In one embodiment, the OIS system 100 may comprise the motor, such as the servo motor 105, coupled to the lens 103 and configured to actuate the lens towards the target position as determined/calculated by the control unit 104. The servo motor 105 may include, for example, a plurality of voice coil motors 111, 112. The voice coil motors 111, 112 may be communicatively coupled to, and receive instructions from, the control unit 104. The voice coil motors 111, 112 may be configured to actuate/move the lens 103 along the various dimensions in at least two directions. For example, the first voice coil motor 111 may be configured to move/actuate the lens 103 back and forth along the X-axis and a second voice coil motor 112 may be configured to move/actuate the lens 103 back and forth along the Y-axis.

The voice coil motors 111, 112 may be configured to be communicatively linked to, and receive instructions from, the control unit 104. For example, when control unit 104 determines a new target position to move the lens 103 into, the control unit 104 may be configured to transmit target position instructions to the servo motor 105 and/or the voice coil motors 111, 112 to initiate the process of actuating/moving the lens 103 towards the determined target position.

In one embodiment, the OIS system 100 may be configured with a control unit 104 coupled to at least one of the lens 103, position detection sensor 107, and/or the accelerometer 108. The control unit 104 may be configured to receive information and/or data from various components of the OIS system 100 such as the springs 106, lens 103, position detection sensor 107, accelerometer 108, and/or the like. The control unit 104 may further be configured to receive information and/or data from the gyro sensors 101 and/or the servo motor 105. For example, in one configuration, the control unit 104 may be configured to actuate the lens 103 using an iterative process which incorporates feedback data from the servo motor 105.

In one embodiment, the control unit 104 may be further configured with any suitable system or device configured to calculate a target position for the lens 103. For example, the control unit 104 may comprise a processor configured to perform the necessary calculations to actuate/move the lens 103 using information and/or data received from the plurality of springs 106, the position detection sensor 107, accelerometer 108, and/or the like.

The control unit 104 may be configured with any suitable system or device configured to receive, transmit, and/or process information/data. For example, the control unit 104 may comprise a processing unit configured to perform the necessary calculations and/or measurements needed to determine a new target position for the lens 103. The control unit 104 may be configured to calculate a new target position for the lens 103, wherein the new target position comprises a position of the lens 103 wherein the force of gravity 109 and the force of the plurality of springs 106 are in equilibrium. For example, when a user attempts to take a picture using the portable device, the lens 103 may experience changes in position due to the user shaking (or otherwise moving) the portable device which causes the lens 103 to lose focus of the subject of the picture. Thus, the control unit 104 may be configured to operate in conjunction the motor to actuate/move the lens 103 into a new target position, for example to regain focus of the subject of the picture.

Now referring to FIG. 2A, in one embodiment, in operation, the optical image stabilizer (OIS) system 100 may be configured to detect a change in the position of the lens 103 (201). For example, when a user is operating the portable device as a camera, the portable device may experience shaking which may result in the lens 103 being moved from an initial position to a new position. As a result of the shaking and/or lens 103 movements, the image captured by the portable device may become distorted. Thus, the OIS system 100 may be configured to actuate/move the lens 103 to a new position to counteract the movement caused by the shake. The new target position of the lens 103 may comprise a target position wherein the force of the gravity 109 and the force 110 exerted by the plurality of springs 106 are in equilibrium such that minimal electrical power is required to move the lens 103 towards the target position.

In one embodiment, the change in position of the lens 103 may comprise any change in the position of the lens 103 from an initial position. For example, the position of the lens 103 may change with respect to a singular axis (e.g., along the X-axis only) or the position of the lens 103 may change with respect to multiple axis (e.g., along the X-axis, Y-axis, and Z-axis).

In one embodiment, the hall sensors 113, 114 may facilitate the detection of a change in position of the lens 103. As described above, the hall sensors 113, 114 are configured to detect the location of the lens 103 within the camera module 102. For example, the control unit 104 may be configured to request position data of the lens 103 along the X-axis and/or the Y-axis. Upon receipt of the request from the control unit, the hall sensors 113, 114 may be configured to provide the current position data of the lens 103 with respect to the X-axis and/or the Y-axis.

In one embodiment, after the OIS system 100 has detected a change in the position of the lens 103, the OIS system 100 may be configured to measure the acceleration of the change in position (202). The accelerometer 108 may be configured to provide the OIS system 100 and its various components with information/data corresponding to the rate of acceleration. The acceleration data may be transmitted to the control unit 104 for further processing to determine the amount the lens 103 needs to be changed to counteract the movements of the lens 103.

Now referring to FIG. 2B, in one embodiment, the OIS system 100 may be configured to measure the acceleration within multiple lens 103 (or camera module 102) orientations. The OIS system 100 may be configured to measure the acceleration by rotating the axis from a first orientation to a second orientation. For example, the OIS system 100 may measure the rate of acceleration along the Y-axis when the Y-axis is configured as the vertical axis (207). The OIS system 100 may be configured to rotate the Y-axis such that the Y-axis becomes the horizontal axis (i.e., the X-axis) (208) and the same measurements may be performed wherein the X-axis now acts as the vertical axis (209). Rotating the axis and performing the same calculations along both the X-axis and the Y-axis may achieve better data points resulting in a calculated lens 103 position that would require the least amount of electrical power to position the lens 103 into.

Referring back to FIGS. 2A and 2B, in one embodiment, the OIS system 100 may be configured to remove an offset data from the acceleration data (203). Offset data may be predetermined based on the type of lens 103. Lenses 103 may comprise various shapes, sizes, and weights as predetermined by their respective manufacturers. The OIS system 100 may be configured with a list of various lens 103 specifications such that the appropriate offset data may be determined based on the particular manufacturer of the lens 103.

In another embodiment, the offset data may also be measured using the various components of the OIS system 100 such as the hall sensors 113, 114. For example, as described below, the offset data may comprise offset data in a first orientation and an offset data in a second orientation. The offset data may be transmitted to the control unit 104 for further processing to determine the amount the lens 103 needs to be changed.

In one embodiment, the optical image stabilizer system 100 may be configured to pass through only the direct current (DC) component of the acceleration data (204). The optical image stabilizer system 100 may perform the DC pass-thru function using any suitable system or device. For example, a low-pass filter may be utilized to perform the DC pass-thru function such that only frequencies at or below a certain threshold are permitted to pass through the filter.

In one embodiment, the optical image stabilizer system 100 may be configured to calculate a new position of the lens 103 (205). The calculated position may comprise a separate calculation for the first axis (e.g., X-axis) and a separate calculation for the second axis (e.g., Y-axis). For example, a first set of calculations/measurements may be performed when the lens 103 is oriented such that the vertical axis comprises the Y-axis so that the effect of gravity is applied along the vertical axis (i.e., Y-axis). A second set of calculations/measurements may be performed when the lens 103 is oriented such that the vertical axis comprises the X-axis so that the effect of gravity is applied along the vertical axis (i.e., the X-axis). This second measurements may comprise rotating the lens 103 ninety degrees (in either direction) such that the horizontal and vertical axis may be changed between the X-axis and the Y-axis.

In one embodiment, the OIS system 100 may orient the lens 103 such that the Y-axis comprises the vertical axis such that the effect of gravity is applied along the Y-axis. The OIS system 100 may be configured to measure, via the accelerometer 108, the rate of acceleration along the horizontal axis (X-axis) as X_ACC_0G (measured in m/s$^2$). The accelerometer may also be configured to measure the gravitational acceleration rate along the vertical axis (Y-axis) as Y_ACC_1G (measured in m/s$^2$). The OIS system 100 may further be configured to measure the position of the lens 103 along both the horizontal axis (X-axis) as well as the vertical axis (Y-axis) as X_POS_0G and Y_POS_1G, respectively, measured in micrometers (um). The position of the lens 103 along the horizontal and/or vertical axis may be measured using the hall sensors 113, 114 as described above.

The OIS system 100 may be configured to rotate the axis ninety degrees (in either direction) such that the original vertical axis (Y-axis) is now the horizontal axis, and the original horizontal axis (X-axis) is now the vertical axis. The OIS system 100 may be configured to perform similar measurements in this orientation as described above for the first orientation. For example, the accelerometer 108 may be configured to measure the rate of acceleration along the horizontal axis (Y-axis) as Y_ACC_0G (measured in m/s$^2$), and the accelerometer 108 may be configured to measure the gravitational acceleration rate along the vertical (X-axis) as X_ACC_1G (measured in m/s$^2$). The OIS system 100 may further be configured to measure the position of the lens 103 along both the horizontal axis (Y-axis) as well as the vertical axis (X-axis) as Y_POS_0G and Y_POS_1G, respectively, measured in micrometers (um). The position of the lens 103 along the horizontal and/or vertical axis may be measured using the hall sensors 113, 114 as described above.

Utilizing the above calculated/measured data, the OIS system 100 may be configured to calculate the gain data necessary to determine a new position of the lens 103. The gain data may be calculated with respect to the horizontal axis (X_GAIN) as well as the vertical axis (Y_GAIN) according to the following equations:

$$X_{GAIN} = \frac{X_{POS_{1G}} - X_{POS_{0G}}}{X_{ACC_{1G}} - X_{ACC_{0G}}} \quad \text{(Equation 1)}$$

$$Y_{GAIN} = \frac{Y_{POS_{1G}} - Y_{POS_{0G}}}{Y_{ACC_{1G}} - Y_{ACC_{0G}}} \quad \text{(Equation 2)}$$

After determining the gain data for the horizontal axis and the vertical axis, the OIS system 100 may be configured to calculate/measure the current acceleration data along the horizontal axis (X-axis) and the vertical axis (Y-axis) as X_ACC_PRE and Y_ACC_PRE, respectively, measured in m/s$^2$. The OIS system 100 may utilize the accelerometer 108 to calculate/measure the values of X_ACC_PRE and Y_ACC_PRE.

In one embodiment, the OIS system 100 may be configured to determine a new position of the lens 103 along the horizontal (X-axis) and the vertical axis (axis) according to the equations below:

$$X_{POS_{TGT}} = X_{POS_{0G}} + \frac{X_{POS_{1G}} - X_{POS_{0G}}}{X_{ACC_{1G}} - X_{ACC_{0G}}} * (X_{ACC_{PRE}} - X_{ACC_{0G}}) \quad \text{(Equation 3)}$$

$$Y_{POS_{TGT}} = Y_{POS_{0G}} + \frac{Y_{POS_{1G}} - Y_{POS_{0G}}}{Y_{ACC_{1G}} - Y_{ACC_{0G}}} * (Y_{ACC_{PRE}} - Y_{ACC_{0G}}) \quad \text{(Equation 4)}$$

In one embodiment, after the optical image stabilizer (OIS) system 100 has determined a new target position for the lens 103, the OIS system 100 may perform the adjustment in a single process or the OIS system 100 may utilize an iterative process to adjust the lens 103. For example, the OIS system 100 may determine that the new position of the lens requires a movement of 29.2 um along the X-axis (X_POS_TGT) and 44.3 um along the Y-axis (Y_POS_TGT).

In one embodiment, the OIS system 100 may be configured to perform the adjustment in a single step. In other words, after the system has determined the amount that the lens needs to be adjusted, the adjustment is made all at once without incorporating additional information and/or data. In the above example, if the OIS system determines that the new target position for the lens requires moving the lens 29.2 um along the X-axis and 44.3 um along the Y-axis, then the OIS system 100 and its various components (e.g., the voice coil motors 111, 112) may be configured to perform the necessary movements in a single process.

In another embodiment, the OIS system 100 may be configured to perform the adjustment in an iterative method, wherein an initial change to the lens 103 is made, and then a new set of calculations is performed. The iterative process may further comprise gradually and/or actuating the lens 103 in a step-by-step fashion. For example, in the above example, instead of making the full 29.2 um and 44.3 um adjustments in a single step, the OIS system may be configured to make a small change first, and then perform the calculations again to determine a new target position which incorporates the previous calculation. Adjusting the lens 103 via an iterative process may result in a more accurate target position for the lens 103 at the expense of utilizing more electrical power in performing the necessary calculations.

Now referring to FIG. 3, a graph showing the amount of electrical current used by the OIS system 100 is shown. As shown in the left portion of the graph (when the OIS system 100 is disabled and/or otherwise not operating), electrical current is used by the camera system to move the lens 103 according to detected movements of the lens (e.g., acceleration along the X-axis and/or the Y-axis). As shown in the right portion of the graph (when the OIS system 100 is enabled and/or otherwise operating), electrical current used by the OIS system 100 is kept to a minimum despite detected movements of the lens 103.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. An optical image stabilizer for a lens of a camera module, comprising:
    a set of springs connected to the lens;
    a position detection sensor linked to the lens and configured to detect a current position of the lens;
    an accelerometer communicatively linked to the lens and configured to generate a set of acceleration data corresponding to an acceleration of the lens;
    a control unit coupled to at least one of the lens, the position detector sensor, and the accelerometer, wherein the control unit is configured to calculate a target position for the lens according to:
        a set of measurements for the lens in a first orientation; and
        a set of measurements for the lens in a second orientation; and
    a motor coupled to the lens and configured to actuate the lens towards the target position.

2. The optical image stabilizer of claim 1, wherein the motor comprises:
    a first actuator communicatively coupled to the control unit, wherein the first actuator is configured to actuate the lens along a first axis; and
    a second actuator communicatively coupled to the control unit, wherein the second actuator is configured to actuate the lens along a second axis.

3. The optical image stabilizer of claim 1, wherein the position detection sensor comprises:
    a first sensor configured to determine the position of the lens along a first axis; and
    a second sensor configured to determine the position of the lens along a second axis.

4. The optical image stabilizer of claim 1, wherein the acceleration data comprises an acceleration data along a first axis and an acceleration data along a second axis.

5. The optical image stabilizer of claim 1, wherein the target position of the lens comprises a position of the lens that requires the least amount of electrical power.

6. The optical image stabilizer of claim 1, wherein the motor is configured to position the lens into the target position in at least one of a single process and in an iterative process.

7. A computer-implemented method of operating an optical image stabilizer for a lens of a camera module coupled to a gyro sensor system and disposed within a portable device, comprising:
    detecting from a position detection sensor linked to the lens:
        an initial position of the lens according to a force of gravity on the lens and a force applied by a set of springs connected to the lens; and
        a new position of the lens resulting from a movement of the lens;
    receiving from an accelerometer coupled to the lens a set of acceleration data corresponding to an acceleration rate of the lens in at least two dimensions;
    determining a target position for the lens based on the acceleration data, comprising:
        orienting the lens in a first orientation, wherein: a first axis comprises a vertical axis upon which the force of gravity applies;
        performing a set of measurements in the first orientation;
        orienting the lens in a second orientation, wherein: a second axis comprises the vertical axis upon which the force of gravity applies; and
        performing a set of measurements in the second orientation; and
    actuating the lens towards the target position.

8. The method of claim 7, further comprising removing an offset data from the acceleration data, wherein the offset data comprises a first offset data in the first orientation and a second offset data in the second orientation.

9. The method of claim 7, further comprising calculating a gain data along the first axis and the second axis in both the first orientation and the second orientation.

10. The method of claim 9, wherein determining the target position further comprises incorporating at least one of the offset data and the gain data.

11. The method of claim 7, wherein actuating the lens towards the target position comprises a single operation.

12. The method of claim 7, wherein actuating the lens towards the target position comprises an iterative process, wherein after each repositioning, a new set of calculations is performed to determine a new target position.

13. The method of claim 7, wherein the target position comprises a position of the lens where the force of gravity and the force of the set of springs are in equilibrium.

14. An optical image stabilizer for a lens of a camera module coupled to a gyro sensor system and disposed within a portable device, comprising:
    a set of springs connected to the lens;

a position detection sensor linked to the lens and configured to detect a position data comprising:
an initial position of the lens under a force of gravity and a force applied by the set of springs; and
a new position of the lens resulting from a movement of the portable device;
an accelerometer communicatively linked to the lens and configured to measure a set of acceleration data corresponding to an acceleration rate of the lens;
a control unit coupled to at least one of the lens, the position detector sensor, and the accelerometer, wherein the control unit is configured to:
receive the acceleration data from the accelerometer;
receive the new position data from the position detection sensor; and
calculate a target position, comprising:
orienting the lens in a first orientation, wherein: a first axis comprises a vertical axis upon which the force of gravity applies;
performing a set of measurements in the first orientation;
orienting the lens in a second orientation, wherein: a second axis comprises the vertical axis upon which the force of gravity applies; and
performing a set of measurements in the second orientation; and
a servo motor coupled to the lens and configured to actuate the lens into the target position.

15. The optical image stabilizer of claim 14, wherein performing a set of measurements in the first and second orientations comprises:
removing an offset data from the acceleration data, wherein the offset data comprises a first offset data in the first orientation and a second offset data in the second orientation; and
calculating a gain data along the first axis and the second axis in both the first orientation and the second orientation.

16. The optical image stabilizer of claim 15, further comprising calculating a gain data along the first axis and the second axis in both the first orientation and the second orientation.

17. The optical image stabilizer of claim 14, wherein the target position of the lens comprises a position of the lens that requires the least amount of electrical power.

* * * * *